United States Patent [19]

Letkeman et al.

[11] Patent Number: 5,659,738

[45] Date of Patent: Aug. 19, 1997

[54] METHOD OF OPERATING A COMPUTER PROGRAM USING DATABASE SCHEMA AND RELATED LANGUAGE DICTIONARIES

[75] Inventors: Kim D. Letkeman, Nepean; Susan T. Harford, Woodlawn, both of Canada

[73] Assignee: Mitel Incorporated, Ontario, Canada

[21] Appl. No.: 962,330

[22] Filed: Oct. 16, 1992

[51] Int. Cl.⁶ ................................... G06F 17/30
[52] U.S. Cl. ............................................ 395/613
[58] Field of Search ............................ 395/600, 611, 395/612, 613

[56] References Cited

U.S. PATENT DOCUMENTS

| | | | |
|---|---|---|---|
| 4,774,661 | 9/1988 | Kumpati | 395/600 |
| 4,841,433 | 6/1989 | Hakim et al. | 395/600 |
| 5,274,802 | 12/1993 | Altine | 395/600 |
| 5,388,258 | 2/1995 | Larsson et al. | 396/600 |
| 5,418,957 | 5/1995 | Narayam | 395/600 |

OTHER PUBLICATIONS

F. Allen et al "The Integrated Dictionary/Directory System" ACM Comp. Surv. vol. 14, No. 2, pp. 245–286, 1982.

W. Durell, Data Administration, McGraw–Hill Pub. pp. 18–31 & 130–65, 1985.

P. Uhrowczik, "Data Dictionary/Directories" IBM Systems Journal, vol. 12, No. 4, pp. 332–350, 1973.

*Primary Examiner*—Thomas G. Black
*Assistant Examiner*—Jack M. Choules
*Attorney, Agent, or Firm*—Antonelli, Terry, Stout & Kraus, LLP.

[57] ABSTRACT

A method of operating a computer program comprised of encoding a description of each view and field of a database into a database schema loading the database schema onto a switching platform during commissioning thereof preparing language dictionaries storing phrases representing all legal data values within the database, including view and field names loading said dictionaries onto the switching platform each time the switching platform is rebooted, loading the schema and related language dictionaries into a RAM used by a processor of the switching platform, and using a standard database program language as an interpreter of the meta-data within the database schema.

2 Claims, 4 Drawing Sheets

METHOD OF OPERATING A COMPUTER PROGRAM USING DATABASE SCHEMA AND RELATED LANGUAGE DICTIONARIES

FIELD OF THE INVENTION

This invention relates to computers, and particularly to a method of operating a computer program.

BACKGROUND TO THE INVENTION

A standard database command (or manipulation) language is TL1, which has been standardized by BellCore for public switching platforms (systems) and network equipment. This language is based on the CCITT Z.300 series recommendations for man-machine language.

Classical implementation methods would involve creating a lexical analyzer using the lex software available on virtually all UNIX platforms. Then a Yacc parser supplemented by custom code is created to handle the semantic processing. Unfortunately, these methods essentially hardcode the field names and associated values such that any variation in the syntax or semantics of a particular database view of a field requires a new software build. In typical systems where several different databases and/or languages are used by the same software this leads to a proliferation of software builds and significant inflexibility.

Because of these problems, independent languages and multiple schema capability are typically not available on-switching machine or on-switching platform because of these problems.

SUMMARY OF THE INVENTION

From software release to software release, in accordance with this invention no software maintenance work is required at all within the TL1 language software. Instead, a database schema and related language dictionaries are loaded into the system with the new software load and the existing TL1 language code runs from this new data. An immense amount of custom coding is avoided.

Because the database schema and language dictionaries exist in a highly encoded form, they can be interpreted by other database language processors and/or applications to provide access to the switching system's data. For example, an off-board form-based customer data entry can paint a TL1 compatible interface into windows on a personal computer, allowing a simplified switch programing mechanism. This package also survives from software load to software load with only a change in database schema and language dictionary files.

In accordance with an embodiment of the invention, a method of operating a computer program is comprised of encoding a description of each view and field of a database into a database schema loading the database schema onto a switching platform during commissioning thereof preparing language dictionaries storing phrases representing all legal data values within the database, including view and field names loading said dictionaries onto the switching platform each time the switching platform is rebooted, loading the schema and related language dictionaries into a RAM used by a processor of the switching platform, and using a standard database program language as an interpreter of the meta-data within the database schema.

BRIEF INTRODUCTION TO THE DRAWINGS

A better understanding of the invention will be obtained by reference to the description below in conjunction with the following drawings, in which.

DETAILED DESCRIPTION OF THE INVENTION

Figure 1:
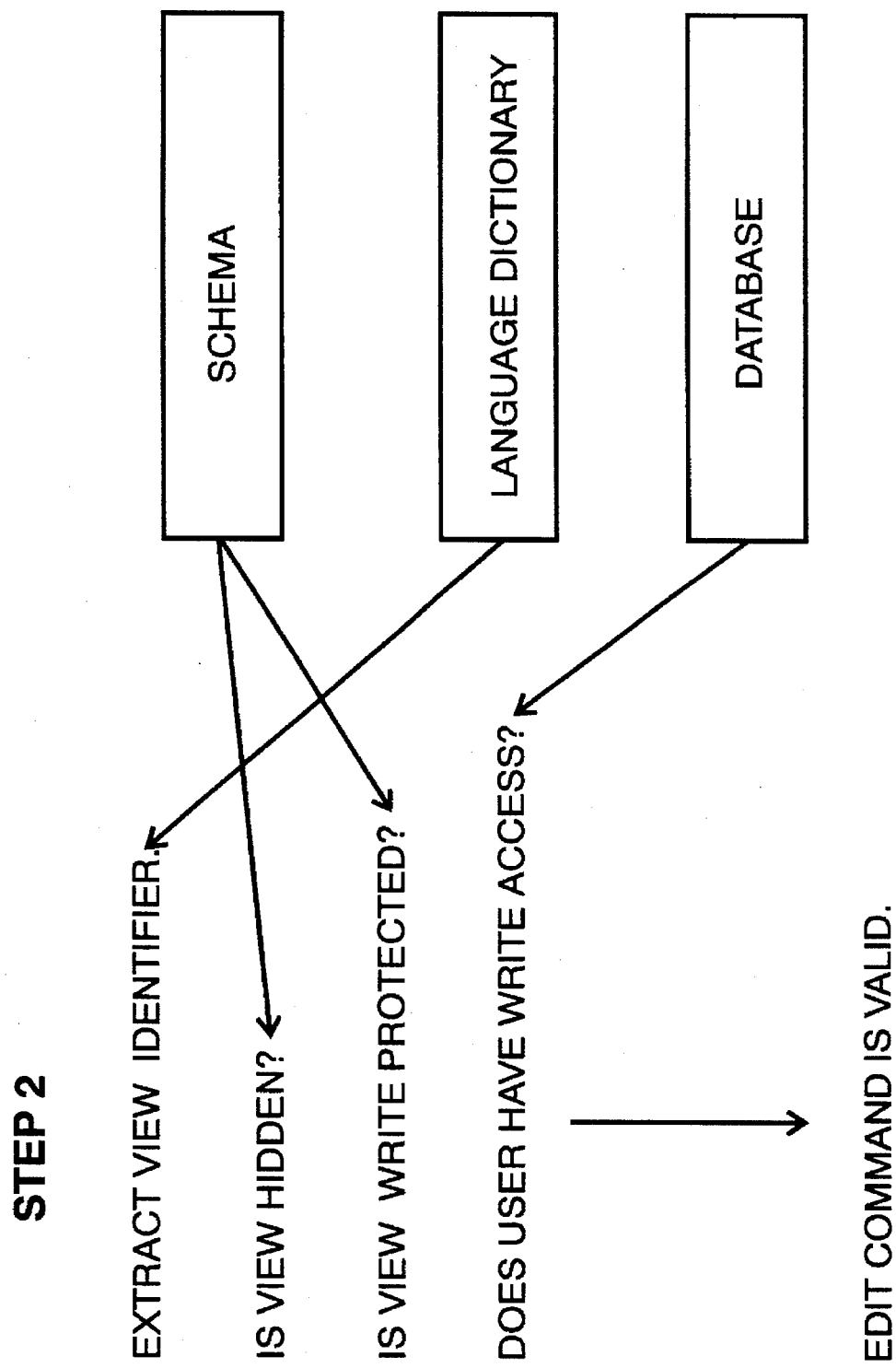
FIG. 1 illustrates in a flow diagram the functionality of a second process step used in the invention.

A description of each view and field is encoded into a database schema and is loaded onto the switching platform during commissioning thereof. As well, language dictionaries storing phrases representing all legal data values (including view and field names) within the database are built off-line and then are loaded onto the switching platform.

Each time the system is rebooted, the schema and related language dictionaries are loaded into switching system RAM. After this, the TL1 language runs as an interpreter of the data (or more accurately, meta-data) within the database schema.

For every TL1 command, the system retrieves from the schema RAM area each bit of data about each field within the database command.

A typical database command utilizes the following steps during processing:

1. Parse command syntax and build a parse tree describing the location of all data blocks, field names, and field values. No checking of identifier validity or field content validity is done at this time.
2. Verify, from the schema and language dictionaries that the TL1 command and view identifier are a valid combination.
3. Verify, from the schema and language dictionaries, that the field value within the access identifier block has valid syntax and semantics; i.e. if the command is enter, verify that this key field does not already exist within the database. If necessary, store the retrieved database tuple in system RAM for later use.
4. Scan across the data block and perform these steps for each field that has been entered:
    a) Verify, from the schema and language dictionaries, that the field name exists.
    b) Verify, from the schema and language dictionaries, that the field data is of the correct type and holds a legal value for that field.
    c) Insert, using size and position data from the schema, the data value in binary form into the database tuple.
5. Scan across the data block and perform these steps for each field that has not been entered:
    a) Verify, from the schema, that the field is optional, i.e. need not be filled.
    b) For edit commands do nothing more. For enter commands, extract the default value from the database schema and stuff it into the database tuple in binary form.
6. Execute the particular TL1 command. For example, enter and edit commands require writing the tuple into the system database RAM at this time.

To access a different database, a different set of schema and language dictionary files is simply loaded into RAM, and the pointers are changed.

A specific example will be given with reference to the drawings and tables shown below.

An example of a command is: "enter-system config::1-2-2:::programmed card=single party line" (quotations do not form part of the command).

Table 1 illustrates the information units, after the first step described above. Table 2 illustrates the parameters after the second step. The token numbers relate to Table 1.

The tables are shown at the end of this disclosure.

Command and Block information is as follows, after the first step. Parms relate to Table 2.

command: token 1 view identifier: token 3 blocks: 5 target id block: null access id block: null correlation tag block: null access id block: 1 parm, first is parm 1 correlation tag block: null general block: null data block: 1 parm, first is parm 2

FIG. 1 illustrates in a flow diagram the functionality of the second process step described above.

Figure 2:
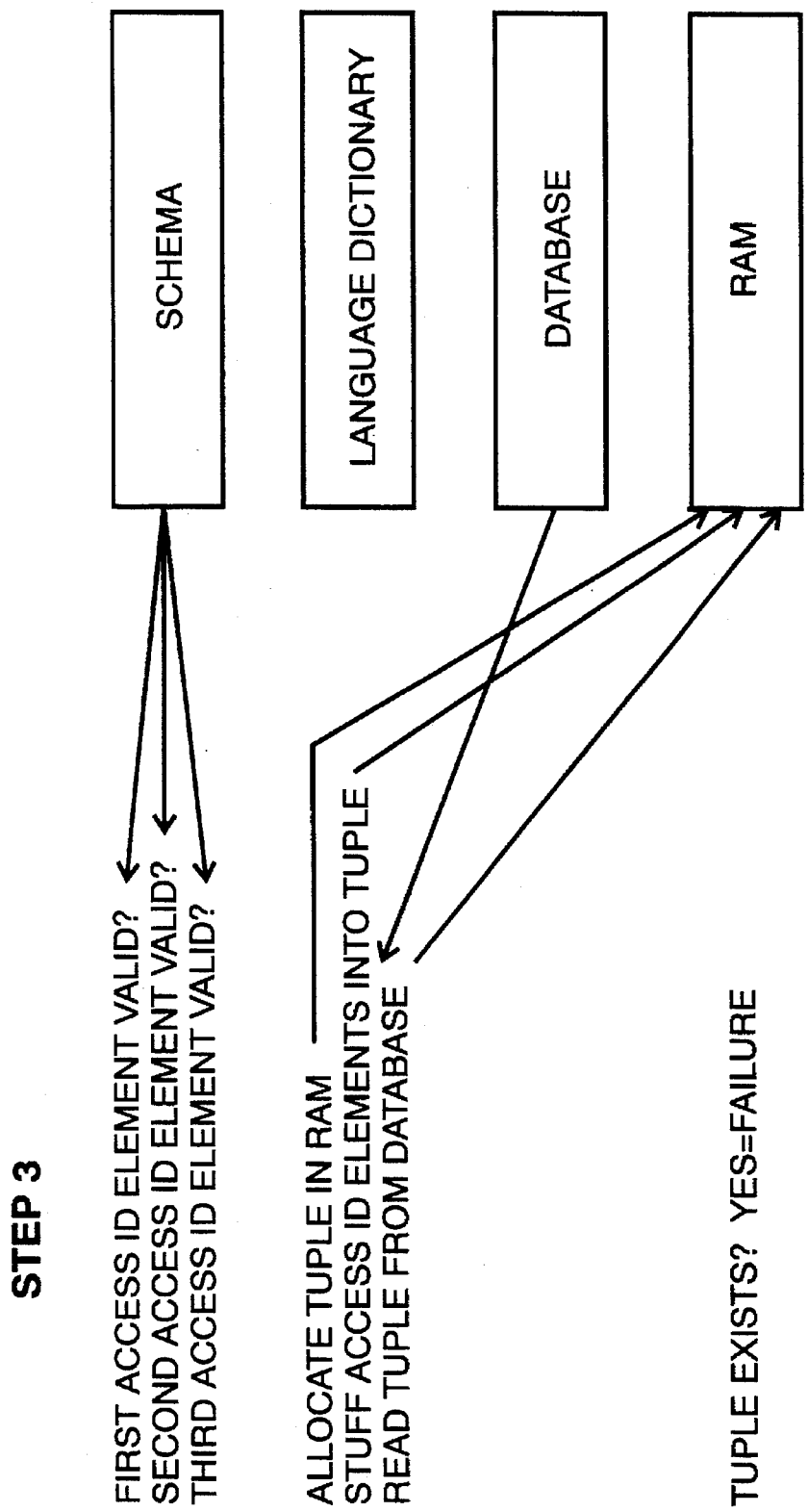
FIG. 2 illustrates in a flow diagram the functionality of a third process step used in the invention.

FIG. 2 illustrates in a flow diagram the functionality of the third process step described above.

Figure 3:
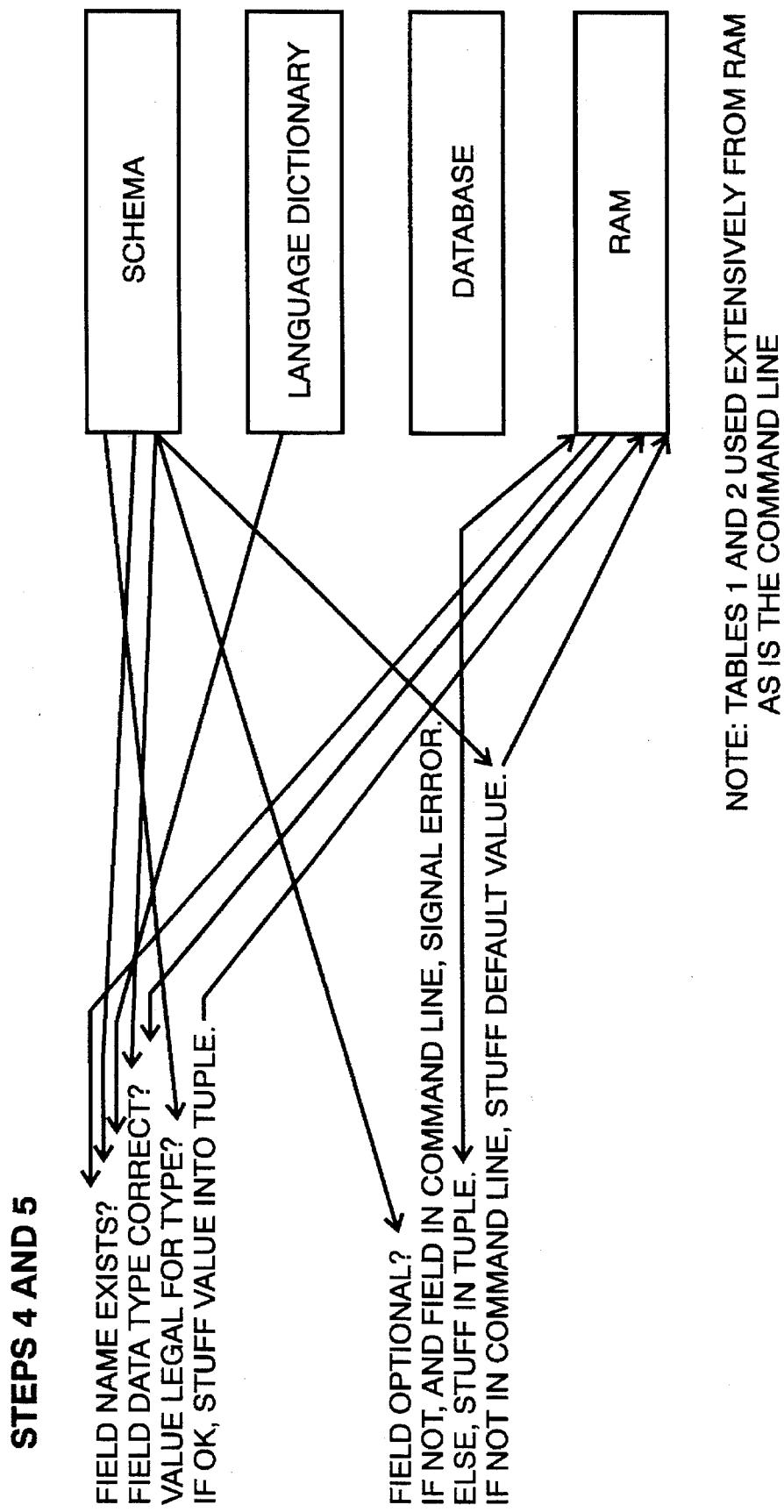
FIG. 3 illustrates in a flow diagram the functionality of fourth and fifth process steps used in the invention.

FIG. 3 illustrates in a flow diagram the functionality of the fourth and fifth process steps described above.

Figure 4:
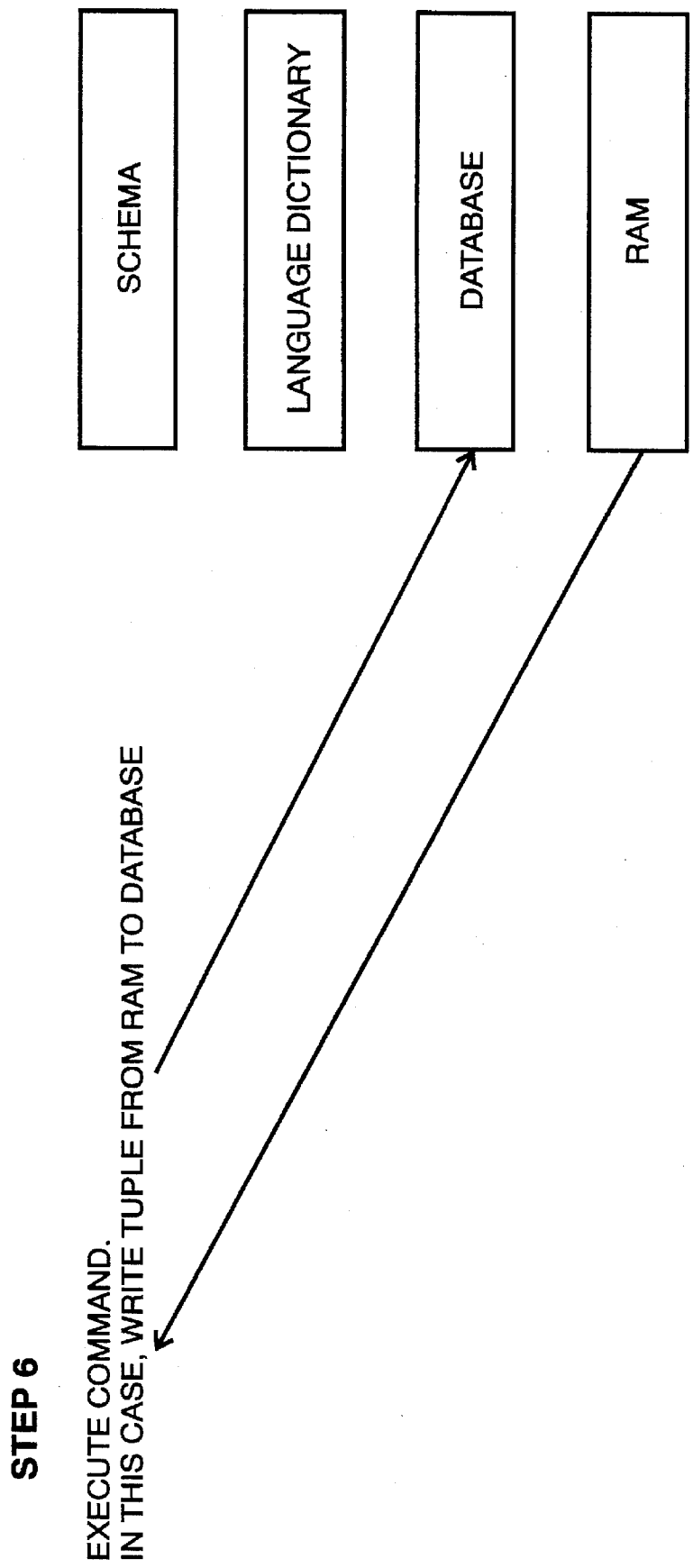
FIG. 4 illustrates in a flow diagram the functionality of a sixth process step used in the invention.

FIG. 4 illustrates in a flow diagram the functionality of the sixth process step described above.

It should be noted that Tables 1 and 2 are used extensively from RAM, as is the command line.

A variation of data driven TL1 can be used as a communications pipe between the switching platform and the off-board data entry platform and will be equally immune from database changes.

TABLE 1

Information Units

| Token | Type | Start | Length | From FIG. 1 | |
|---|---|---|---|---|---|
| 1 | identifier | 1 | 5 | enter | |
| 2 | hyphen | 6 | 1 | — | |
| 3 | identifier | 7 | 10 | sys config | |
| 4 | colon | 17 | 1 | : | |
| 5 | colon | 18 | 1 | ; | |
| 6 | digits | 19 | 1 | 1 | |
| 7 | hyphen | 20 | 1 | — | |
| 8 | digits | 21 | 1 | 2 | After step 1. |
| 9 | hyphen | 22 | 1 | — | |
| 10 | digits | 23 | 1 | 2 | |
| 11 | colon | 24 | 1 | : | |
| 12 | colon | 25 | 1 | : | |
| 13 | colon | 26 | 1 | : | |
| 14 | identifier | 27 | 14 | programed card | |
| 15 | equal sign | 41 | 1 | = | |
| 16 | identifier | 42 | 17 | single party line | |
| 17 | semi-colon | 59 | 1 | ; | |

TABLE 2

Parameters

| Parm | Name | Elements | First | |
|---|---|---|---|---|
| 1 | null | 3 | token 6 | After step 1. |
| 2 | token 14 | 1 | token 16 | Token numbers relate to table 1. |

We claim:

1. A method performed by computer of operating a computer program, comprising the steps of:

(a) encoding a description of each view and field of a database into a database schema;

(b) loading the database schema onto a switching platform during initial operation thereof;

(c) preparing language dictionaries storing phrases representing all expected data values within the database, including view and field names;

(d) loading said dictionaries onto the switching platform;

(e) each time said switching platform is rebooted, loading the schema and related language dictionaries into a RAM used by a processor of the switching platform;

(f) using a standard database program language as an interpreter of meta-data within the database schema, (g) wherein the step of encoding a description of each view and field of a data base into a database schema includes encoding a description other than actual data, (h) the step of loading includes loading of the encoded description other than the actual data, and (i) the step of preparing language dictionaries includes preparing a database of specifications of data and information processing resources storing all phrases representing all expected data values within the data base, and the meta-data is program description data which is interpreted by the standard database program language.

2. A method performed by computer of operating a computer program, comprising the steps of:

(a) encoding a description of each view and field of a database into a database schema;

(b) loading the database schema onto a switching platform during initial operation thereof;

(c) preparing language dictionaries storing phrases representing all expected data values within the database, including view and field names;

(d) loading said dictionaries onto the switching platform;

(e) each time said switching platform is rebooted, loading the schema and related language dictionaries into a RAM used by a processor of the switching platform;

(f) using a standard database program language as an interpreter of meta-data within the database schema, (g) for every standard database program language command, retrieving from said RAM each bit of data about each field within the database command, (h) the step of encoding a description of each view and field of a data base into a database schema includes encoding a description other than actual data and the step of loading includes loading of the encoded description other than actual data, and (i) the step of preparing language dictionaries includes preparing a database of specifications of data and information processing resources storing all phrases representing all expected data values within the data base, and the meta-data is program description data which is interpreted by the standard database program language.

* * * * *